United States Patent

Patterson

[15] 3,646,827

[45] Mar. 7, 1972

[54] ASSEMBLY ADAPTED FOR USE WITH BALL SCREW ACTUATOR

[72] Inventor: Donald S. Patterson, Corona, Calif.

[73] Assignee: Sargent Industries, Inc., Los Angeles, Calif.

[22] Filed: Feb. 12, 1970

[21] Appl. No.: 10,873

[52] U.S. Cl.................................74/424.8, 74/459, 277/165
[51] Int. Cl.......................F16h 1/18, F16h 55/22, F02f 5/00
[58] Field of Search..................74/459 X, 424.8; 277/165 X

[56] References Cited

UNITED STATES PATENTS

| | | | |
|---|---|---|---|
| 2,757,548 | 8/1956 | Smith et al. | 74/459 X |
| 2,841,026 | 7/1958 | Glass | 74/424.8 R |
| 3,116,931 | 1/1964 | Edwards | 74/459 X |
| 3,132,719 | 5/1964 | Cole | 74/424.8 R X |
| 3,421,383 | 1/1969 | Smith et al. | 74/424.8 R |
| 3,532,004 | 10/1970 | Nilsson | 74/459 |

*Primary Examiner*—Leonard H. Gerin
*Attorney*—Smyth, Roston & Pavitt

[57] ABSTRACT

A tubular housing for receiving a screw and having a seal therein adapted to cooperate with the screw. A scraper is formed on the housing for removing foreign material from the screw. A helical rib is formed on the housing for cooperation with the groove of the screw to act as a safety feature.

30 Claims, 4 Drawing Figures

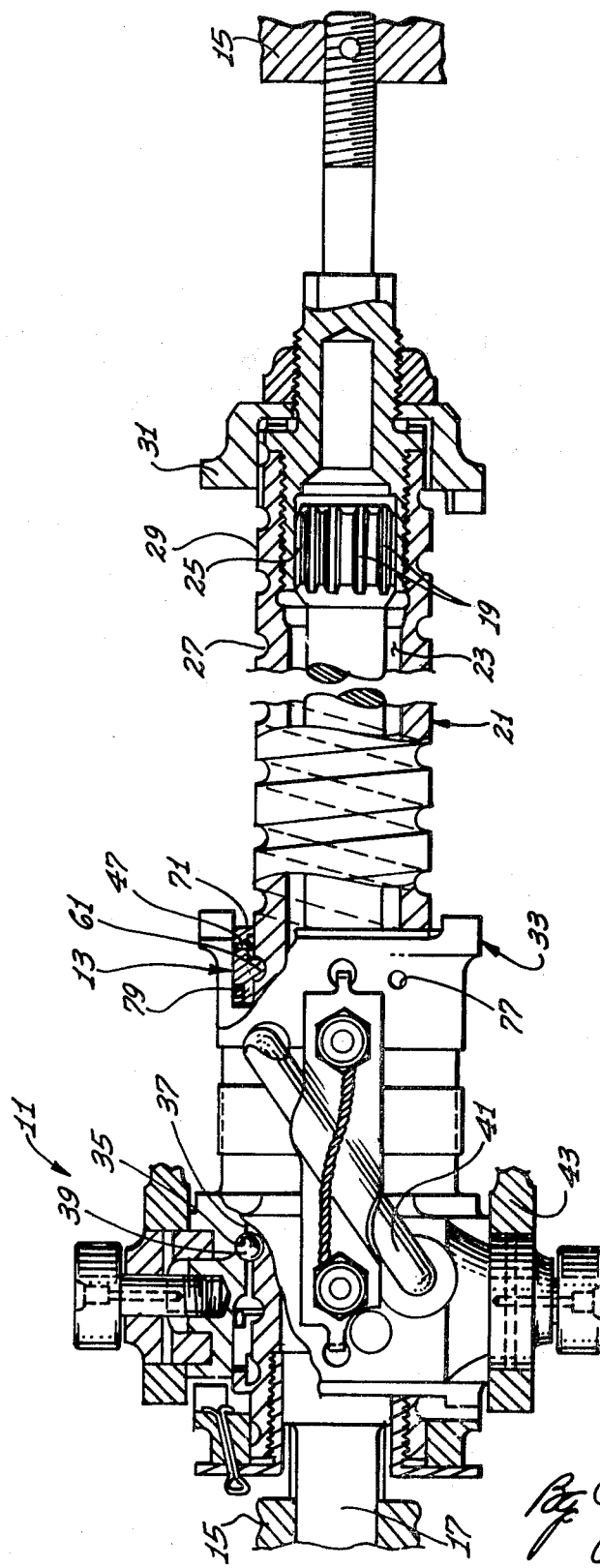

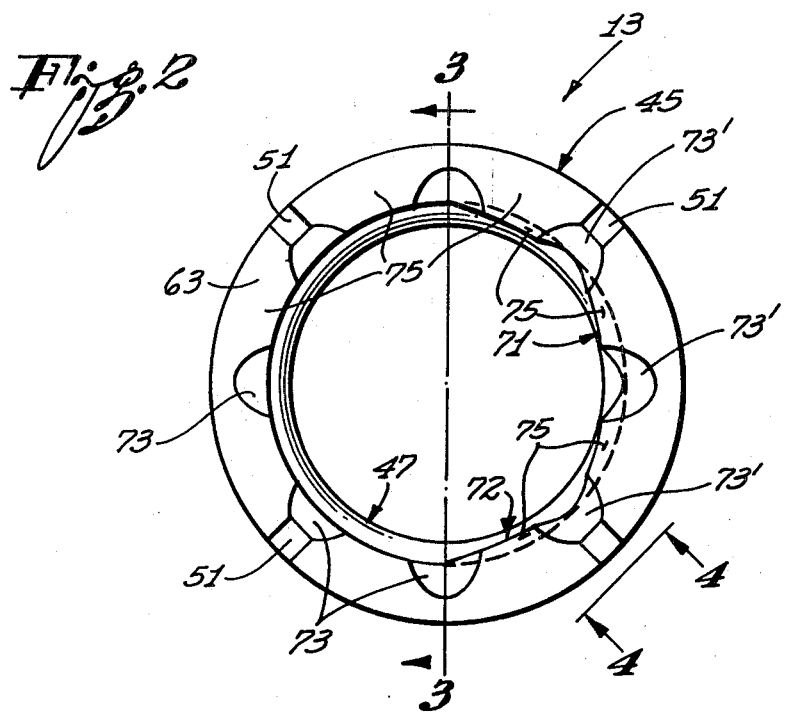
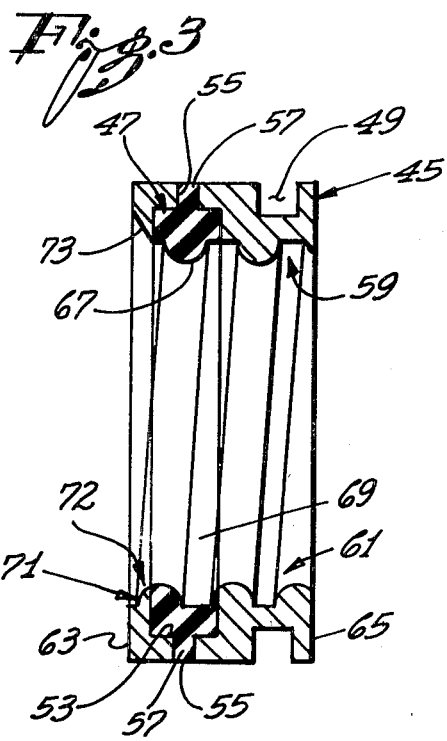
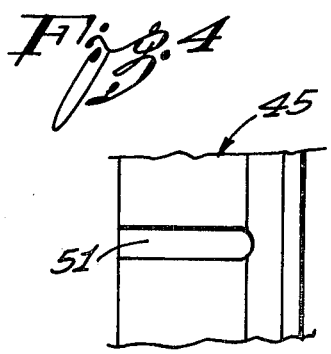

ASSEMBLY ADAPTED FOR USE WITH BALL SCREW ACTUATOR

BACKGROUND OF THE INVENTION

This invention relates to a multipurpose device which is particularly adapted for use with a ball screw actuator or similar devices which employ grooved, relatively rotatable members. As is well known, a ball screw actuator typically includes two or more helically grooved members which define a race for a plurality of balls. The members rotate and translate relative to each other with minor friction losses to provide the desired output motion.

It is necessary to lubricate the relatively rotatable members of a ball screw actuator such as a screw and a nut of the actuator and to hold the lubricant within a prescribed reservoir region. To accomplish this, a seal is used which minimizes or controls leakage of the lubricant from the reservoir. Heretofore such seals have been constructed of felt and similar materials which retain abrasives and contaminants which might scratch the screw. Another problem with such a seal relates to the difficulties of easily and rapidly mounting the seal for cooperation with the appropriate member of the actuator.

Ball screw actuators are often used in exposed areas in which foreign matter such as ice, mud, etc. can accumulate on the screw or other working parts of the actuator. Such foreign material can jam the actuator or at best significantly increase friction losses and wear.

Ball screw actuators are frequently used in aircraft and as such reliability is extremely important. If the balls of the actuator escape such as through a broken return tube, the actuator completely fails as it is incapable of providing the desired output motion.

SUMMARY OF THE INVENTION

The present invention provides an assembly which overcomes all of the above noted disadvantages. With the present invention, the seal is mounted on and supported by a tubular member. The tubular member in turn can be easily mounted on a member of the actuator such as a nut thereof.

The seal is preferably constructed of resilient deformable material such as rubber which will not readily hold abrasives or contaminants. The seal is mounted in the tubular member by cooperating projections and cavities on the seal and tubular member which mechanically interlock. Preferably the seal is cast in situ. This provides a rapid and efficient manner of mounting a seal.

The seal may be axially short but should extend through a full 360° of the screw. This means that portion of the seal will be in the form of a helical rib which cooperates with the confronting portion of the helical groove of the screw. Other portions of the seal will be relatively flat to cooperate with the confronting rib portions of the screw. Of course, it is necessary to blend the flat and rib portions of the seal together over a predetermined circumferential length of the seal.

To remove foreign material, a scraper is provided. The present invention teaches that the scraper can be advantageously mounted on the tubular member which mounts the seal. The scraper has an irregular surface so that relative rotation between it and the cooperating element of the actuator such as the screw results in removal of foreign material from the screw. The scraper includes a ringlike or partial ringlike element projecting radially inwardly from the inner surface of the tubular member. The surface irregularities may be formed by scallops and/or by radially extending teeth.

The scraper preferably is located in a radial plane so that part of the scraper is receivable in the helical groove of the screw and the other part of the scraper confronts the helical rib of the screw. This permits the scraper to clean the groove and rib areas of the screw.

To be most effective, the ringlike element should have a lesser axial dimension than the axial dimension of the cooperating groove of the screw. This provides space through which foreign matter can exit after it has been loosened by the surface irregularities of the scraper.

A primary function of the scraper is to remove foreign matter which might damage the seal. In order to do this, the scraper must be located outboard of the seal.

As a safety feature, the present invention provides a helical, relatively rigid rib for cooperating with the helical groove of a member of the ball screw actuator such as the screw. Such rib can advantageously be integrally formed with the tubular member. If the balls of the actuator escape, the helical rib on the tubular member cooperates with the helical groove of the screw to permit emergency operation of the ball screw actuator. This safety feature is of particular importance when reliability of the ball screw actuator is extremely important such as in aircraft applications.

It is apparent that by appropriately shaping the tubular member, the scraper, safety, and seal mounting functions can be easily and inexpensively obtained. Of course, the several features of the present invention can be employed separately when desired; however, the individual features do cooperate to produce particularly advantageous results in a ball screw actuator or similar devices. Although the description and specific embodiment illustrate the housing being attached to the nut, it should be apparent to those having ordinary skill in the art that the housing may be attached to the screw, in which event, the scraper, helical rib and seal become external members which cooperate with the nut.

The invention, both as to its organization and method of operation, can best be understood by reference to the following description taken in connection with the accompanying illustrative drawings.

BRIEF DESCRIPTION OF THE DRAWINGS

FIG. 1 is an elevational view partially in section of a ball screw actuator employing an assembly constructed in accordance with the teachings of this invention.

FIG. 2 is an enlarged elevational view of an assembly constructed in accordance with the teachings of this invention.

FIG. 3 is a sectional view taken along line 3—3 of FIG. 2.

FIG. 4 is an elevational view taken along line 4—4 of FIG. 2.

DESCRIPTION OF THE PREFERRED EMBODIMENT

FIG. 1 of the drawings illustrates a ball screw actuator 11 having an assembly 13 constructed in accordance with the teachings of this invention incorporated therein. The ball screw actuator 11 is purely illustrative of the kind of device with which the assembly 13 is particularly adapted for use. Thus, other kinds of ball screw actuators or other devices may be employed with the assembly 13.

The ball screw actuator 11 except for the assembly 13 is of conventional construction and accordingly is not described in complete detail herein. Generally, the ball screw actuator 11 includes a supporting structure 15 having a drive shaft 17 rotatably mounted therein. The drive shaft 17 has external splines 19 at the outer end thereof.

A screw 21 having an axial passage 23 receives the shaft 17 and is mounted thereon. The screw 21 has internal splines 25 drivingly engaging the splines 19 of the drive shaft 17 to permit the latter to rotate the screw. A helical groove 27 is formed in the external surface of the screw 21 and defines an external helical rib 29. A stop 31 is suitably mounted on the outer end of the screw 21.

The ball screw actuator 11 also includes a nut 33 having an internal spiral or helical groove 35 defining an internal helical rib 37. The nut 33 receives the screw 21 and the helical grooves 27 and 35 cooperate to define a race for a plurality of balls 39. The balls 39 move in the race in a well-known manner and a return tube 41 is mounted on the exterior of the nut 33 to provide a return path for the balls.

The nut 33 is held against rotation by an output member 43 which is attached to the nut. The assembly 13 is mounted within the nut 33 and it surrounds the screw 21. The assembly 13 is located at the axial outer end of the nut 33.

The operation of the ball screw actuator 11 without considering the functions of the assembly 13 is as follows: The drive shaft 17 is rotated by suitable means such as a motor (not shown). The screw 21 is rotated by the cooperating splines 19 and 25. The screw 21 is held against translation by the supporting structure 15. Rotation of the screw 21 drives the nut 33 and the output member 43 axially along the screw. Specifically, the rotation of the screw causes the balls to cooperate with the nut 33 in a well-known manner to cause the nut to translate.

The details of the assembly 13 can best be seen in FIGS. 2-4. Generally, the assembly 13 includes a rigid tubular member or housing 45 which is preferably constructed of metal or hard plastic and a seal 47 which is preferably constructed of a resiliently deformable elastomeric material such as rubber. The housing 45 has an annular O-ring channel 49 in the exterior surface thereof and one or more axially extending keyways 51. The keyways 51 are formed in the exterior surface of the housing 45 and although four of the keyways are illustrated, any number of the keyways may be utilized.

The tubular housing 45 has an inner annular channel 53 for receiving the seal 47. A plurality of radially extending, circumferentially spaced openings 55 extend between the exterior surface of the housing 45 and the axially extending surface of the channel 53.

The seal 47 is preferably cast in situ so that the openings form a plurality of radial projections 57 which are interlockingly received, respectively, within the openings 55 to thereby mechanically interlock the seal and the housing. If desired, a suitable adhesive may also be utilized between the seal 47 and the housing 45. The housing 45 is rigid and supports and houses the seal 47.

A helical groove 59 is formed on the interior surface of the assembly. The groove 59 extends for the full axial length of the housing 45. A portion of the groove 59 is formed by the housing 45 and another portion of the groove is formed by the seal 47. The groove 59 defines a helical rib 61 which extends for the full axial length of the housing 45. The seal 47 and the housing 45 each form portions of the rib 61.

The groove 59 and the rib 61 are generally configured so as to conform to the cooperating portions of the screw 21 (FIG. 1). It can be seen from FIG. 3 that approximately one full convolution of the rib 61 is constructed entirely of the rigid material of the housing 45 and is integral therewith. This portion of the rib 61 serves the important safety function described hereinabove of permitting operation of the ball screw actuator 11 even if the balls 39 escape. Of course, the circumferential length of the portion of the rib 61 which is adapted to serve this safety function can vary; however, it has been found that one full convolution performs very satisfactorily.

The housing 45 has opposite end faces 63 and 65. In the embodiment illustrated, the end faces 63 and 65 lie in a plane which is perpendicular to the axis of the housing 45. For this reason, the right end of the rib 61 narrows in the axial direction as it spirals toward the end face 65.

The seal 47 is generally annular and has a spiral rib portion 67 which forms a portion of the rib 61. The rib portion 67 blends smoothly with the metal portions of the rib 61 as shown in FIG. 3. The fit of the rib portion 67 into the groove 27 will depend upon the amount of leakage which can be tolerated or which is desirable. Thus, at a given axial cross section, the rib 61 may be constructed entirely of metal, entirely of the resilient material of the seal 47, or from both rubber and metal. Similarly, the seal 47 has a spiral flat 69 which forms a portion of the groove 59. The flat 69 similarly blends smoothly with the metal portion of the groove 59 so that some portions of the groove 59 are constructed of both metal from the housing 49 and resilient material from the seal 47.

A scraper or scraper element 71 includes the portion of the housing 45 to the left of the seal 47 (as viewed in FIG. 3). Specifically, the scraper 71 includes the metal rib portion 72 of the rib 61 to the left of the seal 47 as viewed in FIG. 3. The scraper 71 also includes a plurality of circumferentially spaced scallops 73 formed in the end face 63. The rib portion 72 has an axial dimension less than the axial dimension of the groove 27 of the screw 21 with which it is to cooperate. This provides a space through which the removed foreign material can escape. Although the circumferential length of the rib portion 72 can be varied, in the embodiment illustrated it extends for about 180° as shown in FIG. 2.

The scallops 73 preferably are flared radially outwardly as they project axially outwardly as shown in FIG. 3 to further facilitate escape of the loosened foreign matter. Of course, the configuration, the number and spacing of the scallops 73 can be varied. However, it is desirable to provide surface irregularities such as the scallops 73 to facilitate removal and escape of foreign matter.

As best seen in FIG. 2, the radial dimension or the amount which the rib portion 72 projects radially inwardly from the outside surface of the housing 45 varies as the scraper extends circumferentially as shown in FIG. 2. This enables a portion of the rib portion 72 to be received within the groove 27 of the screw 21 while other regions of the rib portion 72 closely confront or engage the rib 29 (FIG. 1). Because of this varying dimension of the rib portion 72, the radial length of the scallops 73 varies depending upon the circumferential location of the scallop. The scallops preferably form notches in the region of the rib portion 72 which have a larger radial dimension such as shown, for example, by the scallop 73' in FIG. 2. Such notches define radially projecting teeth 75.

In use of the scraper 71, the surface irregularities formed by the scallops 73 loosen foreign material from the screw 21. The thin axial dimension of the rib portion 72 and the openings formed by the scallops 73 facilitate escape of the loosened foreign matter.

The assembly 13 is mounted in a counterbore in the outboard end of the nut 33 as shown in FIG. 1. It is important that the assembly 13 be mounted in the nut 33 for rotation therewith; however, the assembly 13 should be permitted to float axially relative to the nut 33 to the extent of any backlash in the nut. If this degree of axial float of the assembly 13 were not permitted, any backlash in the nut 33 could result in the assembly 13 being the load-bearing member of the actuator 11 rather than the balls 39.

Although various kinds of mounting arrangements may be employed to achieve this result, in the embodiment illustrated a pin 77 is mounted on the nut 13 and projects radially inwardly into one of the keyways 51. The pin, being fixed to the nut 33 causes the assembly to rotate with the nut; however, due to the axial length of the keyway 51, the mounting arrangement does not restrict relative axial movement between the assembly 13 and the nut 33.

An annular sealing ring 79 forms a seal between the assembly 13 and the nut 33. The rib 61 is received in the groove 27 and the seal 47 is at the outboard end of the assembly 13.

In operation of the ball screw actuator 11, the seal 47 forms a relatively good seal between the screw 21 and the nut 33. The scraper 71, which is also at the outboard end of the nut 33 removes ice, mud, etc. from the exterior of the screw 21 as the nut 33 and the screw move relative to each other. The surface irregularities or shoulders formed by the scallops 73 are particularly effective in loosening such foreign matter. The relatively narrow axial dimension of the rib portion 72 and the scallops 73 provide space through which such loosened foreign material can exit. It is apparent that if the balls 39 should somehow escape, the metal portion of the rib 61 would suffice to permit at least emergency operation of the actuator 11.

Although an exemplary embodiment of the invention has been shown and described, many changes, modifications and substitutions may be made by one having ordinary skill in the art without necessarily departing from the spirit and scope of this invention.

I claim:

1. A seal assembly for cooperation with a screw having grooves in the screw, comprising:

a supporting structure having an inner surface defining a passage in said supporting structure and an outer circumferential surface;

one of said surfaces having at least one radial cavity therein;

a seal of deformable material extending circumferentially along said one surface in sealing relationship therewith for a continuous annular distance of at least approximately 360° and constructed to be disposed in the groove in the screw; and said seal having a generally radial projection interlockingly received in said cavity to thereby mechanically interlock the seal and the supporting structure to permit the supporting structure to support the seal.

2. A seal assembly as defined in claim 1 wherein said one surface is said inner surface and said seal is cast in situ in said supporting structure and is provided with a portion defining a spiral rib portion of particular radial and axial dimensions with the supporting structure.

3. A seal assembly as defined in claim 1 wherein said one surface has at one axial end an integral scraper at least a portion of which projects radially and has at spaced intervals an irregular surface shaped radially and axially to direct foreign matter from the assembly.

4. A seal assembly as defined in claim 1 wherein said one surface at least partially defines a helical rib and wherein the seal cooperates with the at least partially defined rib to define the remaining portion of the rib and wherein the axial dimension of the rib is less than that of the associated groove in the screw to provide for the passage of foreign matter from the seal assembly.

5. A seal assembly as defined in claim 4 wherein said one surface has at one axial end an integral scraper at least a portion of which projects radially and has at spaced intervals an irregular surface shaped radially and axially to direct foreign matter from the assembly.

6. A seal assembly as defined in claim 4 wherein the irregular surface at spaced intervals defines scallops which flare radially outwardly as they extend axially outwardly.

7. A seal assembly as defined in claim 6 wherein the irregular surface defines teeth between the scallops.

8. A seal assembly attachable to a supporting structure for cooperation with a screw having grooves in the screw, comprising:

a generally tubular, rigid housing attachable to the supporting structure;

a screw mounted on said supporting structure and receivable in said tubular housing, said screw being movable relative to said housing and having grooves in the screw;

a seal mounted within said housing and circumscribing the screw in generally sealing relationship with the grooves in the screw continuously for an annular distance of at least 360°; and said housing having at one axial end a plurality of cutaway zones contiguous one end thereof and defining surface irregularities for forcibly removing foreign particles which may collect on said screw as the screw moves relative to the housing.

9. An assembly comprising:

a first member having a generally spiral groove therein defining a generally spiral rib;

a relatively rigid member;

means for mounting said first member and said relatively rigid member to permit relative rotation and translation therebetween;

a seal ring mounted on said rigid member and cooperating with said relatively rigid member to define with said relatively rigid member a generally spiral groove defining a generally spiral rib for providing a generally sealing relationship with the groove and the rib in said first member, the sealing ring extending annularly for a distance of at least 360° and the axial dimension of the rib in the seal ring being less than the axial dimension of the groove in the first member to provide for a passage of foreign matter through the space between the groove in the first member and the rib in the seal ring; and said rigid member having a circumferentially extending scraper integral therewith, said scraper projecting generally radially toward the first member and at least a first portion of said scraper being receivable in said groove of said first member, said scraper including means responsive to relative rotation of the members to forcibly remove foreign material from the shaft.

10. An assembly as defined in claim 9 wherein a second portion of said scraper confronts said rib in said first member in close proximity thereto.

11. An assembly as defined in claim 9 wherein said scraper has an irregular surface shaped to facilitate the removal of foreign matter.

12. An assembly as defined in claim 11 wherein said first portion of said scraper has a smaller axial dimension than the axial dimension of said associated groove in said first member to facilitate removal of foreign matter loosened by the scraper.

13. An assembly as defined in claim 12 wherein said irregular surface on said scraper defines generally radially projecting teeth to facilitate the loosening of the foreign material.

14. An assembly as defined in claim 13 wherein said rigid member has a circumferentially extending surface defining at least one cavity therein and said seal has at least one projection receivable in said cavity to mechanically interlock the seal and the rigid member.

15. An assembly as defined in claim 9 wherein said rigid member has a generally spiral rib integral therewith and received in said generally spiral groove in said first member, said last-mentioned rib riding in said groove during relative rotation of said housing and said shaft.

16. A seal assembly as defined in claim 15 wherein the irregular surface in the scraper is shaped radially and axially at spaced intervals to direct foreign matter from the assembly.

17. A seal assembly as defined in claim 16 wherein the irregular surface at spaced intervals defines scallops which flare radially outwardly as they extend axially outwardly and wherein the irregular surface further defines teeth between the scallops.

18. A ball screw actuator comprising:

a screw member having an external generally helical groove thereon defining a generally helical rib;

a nut member having a generally helical internal groove, said nut member receiving said screw member, said grooves defining a race;

a plurality of balls in said race for permitting relative rotation and translation between said screw member and said nut member at relatively low friction;

a relatively rigid tubular element mounted on one of said members whereby said tubular element and the other of said members can move relative to each other;

a seal mounted on said tubular element for cooperation with said other member, said seal being at least partially receivable in said groove of said other member through a continuous annular distance of at least 360°; and said tubular element having a helical rib received in said groove of said other member whereby cooperation between said helical rib of said tubular element and said groove of said other member permit controlled relative rotation and translation between said nut member and said screw member even if said balls escape from said race whereby said helical rib of the tubular element and said groove of said other member provide a safety feature for the ball screw actuator.

19. A ball screw actuator as defined in claim 18 wherein said helical rib of said tubular element projects into said groove of said other member for an annular distance at least approximately 360° and said seal has an axial dimension less than that of said groove of said other member for providing for removal of foreign particles from said tubular element.

20. A ball screw actuator as defined in claim 18 wherein at least a portion of said seal is in the form of a generally helical rib receivable in said groove of said other member, said helical rib of said seal blending smoothly with said helical rib of said tubular element to define a composite rib of a particular axial dimension where the particular axial dimension is less than that of said groove of said other member for providing for a removal of foreign particles from said tubular element.

21. A ball screw actuator as defined in claim 18 wherein said tubular element is mounted on said nut member adjacent one end of said groove of said nut member and wherein the seal on said tubular element is near one end of the tubular element and wherein means are included on the tubular element in contiguous relationship with the seal for cooperating with the seal to facilitate the removal of foreign particles from the tubular element.

22. A ball screw actuator as defined in claim 21 including a scraper on said tubular element, said seal lying axially intermediate said scraper and a central region of said nut, said scraper element projecting toward said screw and having a particular irregular configuration to assist in removal of foreign matter from said screw as said nut and screw move relative to each other.

23. A ball screw actuator comprising:
a screw having an external generally spiral groove thereon defining a generally spiral rib;
a nut having a generally spiral internal groove, said nut receiving said screw, said grooves defining a race;
a plurality of balls in said race for permitting relative rotation and translation between said screw and said nut at relatively low friction;
a relatively rigid tubular member mounted on said nut whereby said tubular member and said screw can move relative to each other;
said tubular member having a generally spiral rib received in said groove of said screw whereby cooperation between said spiral rib of said tubular member and said groove of said screw permit controlled relative rotation and translation between said nut and said screw even if said balls escape from said race;
a seal mounted on said tubular element for cooperation with said screw, said seal being disposed in said groove of said screw through a continuous annular distance of at least 360°; and
a scraper on said tubular member, at least a portion of said scraper element being receivable in said groove of said screw, said scraper including a plurality of surface irregularities to facilitate the removal of foreign material from said screw as said nut and screw move relative to each other.

24. A ball screw actuator as set forth in claim 23 wherein the irregular surface in the scraper is shaped radially and axially at spaced intervals to direct foreign matter from the tubular element and wherein the irregular surface at spaced intervals defines scallops which flare radially outwardly as they extend axially outwardly and wherein the irregular surface defines teeth between the scallops.

25. A ball screw actuator as set forth in claim 24 wherein the seal defines progressive portions of a rib and wherein the progressive portions of the rib defined by the screw and the generally spiral rib of the tubular member define a rib having a particular axial dimension less than the axial dimension of the groove of the screw to obtain the passage of foreign particles through the space between the rib and groove.

26. A seal assembly comprising:
a supporting structure having an inner surface defining a passage in said supporting structure and an outer circumferential surface;
one of said surfaces having at least one radial cavity therein;
a seal of deformable material extending circumferentially along said one surface in sealing relationship therewith for at least approximately 360°; and
said seal having a generally radial projection interlockingly received in said cavity to thereby mechanically interlock the seal and the supporting structure to permit the supporting structure to support the seal, said cavity being a generally radial opening passing through said supporting structure between said surfaces thereof, said supporting structure having a plurality of said radial openings with at least some of said openings being spaced circumferentially, said seal having a plurality of said radial projections interlockingly received in said radial openings, respectively.

27. A seal assembly as set forth in claim 26 wherein the seal cooperates with the housing to define a rib having an axial dimension less than the axial dimension of the groove in the screw to facilitate the removal of foreign particles from the housing and wherein the seal and the housing have cooperating means to provide for the retention of the seal in the housing.

28. A seal assembly attachable to a supporting structure comprising:
a generally tubular, rigid housing attachable to the supporting structure;
a shaft mounted on said supporting structure and receivable in said tubular housing, said shaft being movable relative to said housing;
a seal mounted within said housing and circumscribing the shaft in generally sealing relationship therewith; and
said housing having a plurality of cutaway zones contiguous one end thereof defining surface irregularities for forcibly removing foreign particles which may collect on said shaft as the shaft moves relative to the housing, said cutaway zones including scallops in an end face of said housing.

29. A seal assembly as defined in claim 28 wherein the scallops flare radially outwardly as they extend axially inwardly and wherein the cutaway zones define teeth between the scallops.

30. A seal assembly as set forth in claim 28 wherein the seal cooperates with the housing to define a rib having an axial dimension less than the axial dimension of the groove in the screw to facilitate the removal of foreign particles from the housing.

* * * * *